(12) United States Patent
Kurokawa et al.

(10) Patent No.: US 7,949,827 B2
(45) Date of Patent: May 24, 2011

(54) STORAGE SYSTEM AND ACCESS COUNT EQUALIZATION METHOD THEREFOR

(75) Inventors: Taisuke Kurokawa, Odawara (JP); Toshimichi Kishimoto, Hatano (JP)

(73) Assignee: Hitachi, Ltd., Tokyo (JP)

( * ) Notice: Subject to any disclaimer, the term of this patent is extended or adjusted under 35 U.S.C. 154(b) by 617 days.

(21) Appl. No.: 12/010,047

(22) Filed: Jan. 18, 2008

(65) Prior Publication Data

US 2009/0254701 A1 Oct. 8, 2009

(30) Foreign Application Priority Data

Aug. 8, 2007 (JP) .................. 2007-207232

(51) Int. Cl.
*G06F 12/00* (2006.01)
*G06F 13/00* (2006.01)
*G06F 13/28* (2006.01)
*G06F 15/167* (2006.01)
*G06F 15/16* (2006.01)

(52) U.S. Cl. ........ 711/114; 711/147; 711/100; 711/111; 711/112; 711/165; 709/232; 709/213

(58) Field of Classification Search .................. None
See application file for complete search history.

(56) References Cited

U.S. PATENT DOCUMENTS

| | | | | |
|---|---|---|---|---|
| 6,678,795 B1 * | 1/2004 | Moreno et al. | ................ | 711/137 |
| 7,197,490 B1 * | 3/2007 | English | ................ | 1/1 |
| 2005/0055402 A1 * | 3/2005 | Sato | ................ | 709/205 |
| 2008/0126437 A1 * | 5/2008 | Chiba | ................ | 707/201 |

FOREIGN PATENT DOCUMENTS

JP 2001-067187 8/1999

* cited by examiner

*Primary Examiner* — Stephen C Elmore
*Assistant Examiner* — Marwan Ayash
(74) *Attorney, Agent, or Firm* — Volpe and Koenig, P.C.

(57) ABSTRACT

This invention aims to optimize an entire storage system by equalizing the access counts in appropriate units. When migrating data in pool volumes to equalize the data access counts, which data migration—data migration in units of pages or data migration in units of volumes—is most appropriate is judged based on the information stored in an access information table storing access information, which is the information about the access counts for the data stored in the disk drives and, based on the judgment, data is migrated in units of pages or volumes so that the data access counts are equalized among groups. The data migration is repeated until the data access counts are equalized among the groups.

7 Claims, 15 Drawing Sheets

FIG.4

| TIME \ DAY | MON | TUE | ... | SUN |
|---|---|---|---|---|
| 00:00~00:01 | 30 | 20 | | 0 |
| 00:01~:00:02 | 50 | 20 | | 0 |
| : | : | : | | : |
| 23:58~23:59 | 2000 | 4000 | | 5 |
| 23:59~24:00 | 3000 | 2500 | | 10 |

| | ACCESS COUNT |
|---|---|
| 81 — AVERAGE ACCESS COUNT/min | 50 |
| 82 — AVERAGE ACCESS COUNT/hour field | 1000 |
| : | : |
| 83 — AVERAGE ACCESS COUNT/0K-83K | 5 |
| 84 — AVERAGE ACCESS COUNT/84K-167K | 3 |
| : | : |
| 85 — TOTAL ACCESS COUNT | 100000 |
| 86 — AVERAGE CM ACCESS COUNT/sec | 20 |

87, 80

ECCG ACCESS COUNT
DISTRIBUTION MAP A (TYPE X)

ECCG ACCESS COUNT
DISTRIBUTION MAP B (TYPE Y)

| TWO PAGE ACCESS COUNT DISTRIBUTION MAPS / THROUGHPUT | TYPE X | TYPE Y | DIFFERENT TYPES |
|---|---|---|---|
| HIGH | MIGRATION IN PAGE UNITS | MIGRATION IS NOT PERFORMED | MIGRATION IS NOT PERFORMED |
| MEDIUM | MIGRATION IN PAGE UNITS | MIGRATION IS NOT PERFORMED | MIGRATION IS NOT PERFORMED |
| LOW | MIGRATION IN PAGE UNITS | MIGRATION IN VOLUME UNITS | MIGRATION IS NOT PERFORMED |

| ECC GROUP | ACCESS COUNT |
|---|---|
| ECCG 1-1 | 100 |
| ECCG 3-1 | 80 |
| ECCG 1-2 | 80 |
| ECCG 1-3 | 70 |
| ECCG 1-5 | 70 |
| ECCG 2-1 | 70 |
| ECCG 3-2 | 50 |
| ECCG 2-2 | 50 |
| ECCG 1-4 | 20 |

| | |
|---|---|
| LDEV# 00:00:40 | LARGE |
| LDEV# 00:00:10 | |
| LDEV# 00:00:30 | |
| LDEV# 00:00:00 | SMALL |

FIG.15A      FIG.15B
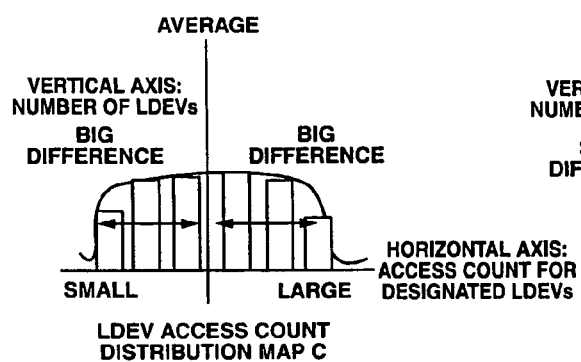
LDEV ACCESS COUNT DISTRIBUTION MAP C
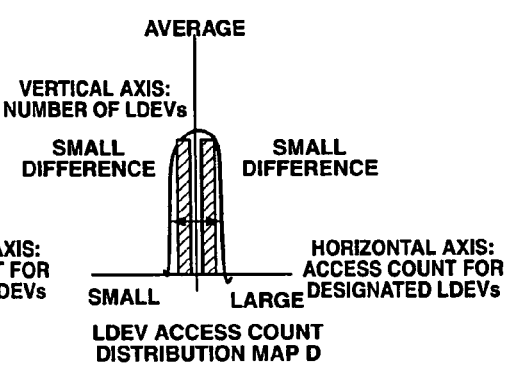
LDEV ACCESS COUNT DISTRIBUTION MAP D
FIG.16
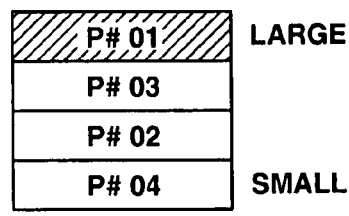

FIG.17A
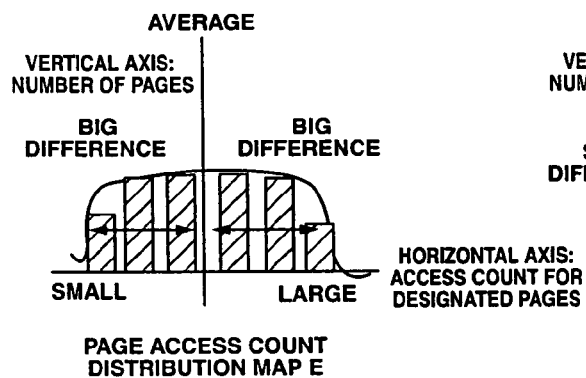
PAGE ACCESS COUNT
DISTRIBUTION MAP E
FIG.17B
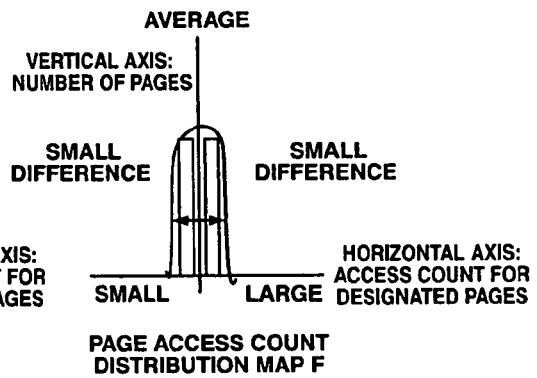
PAGE ACCESS COUNT
DISTRIBUTION MAP F
FIG.18
Q40
| | |
|---|---|
| LDEV# 00:00:01 | LARGE |
| LDEV# 00:00:02 | |
| LDEV# 00:00:04 | |
| LDEV# 00:00:03 | SMALL |

FIG.19A
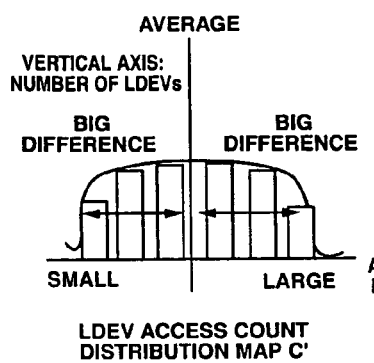
LDEV ACCESS COUNT
DISTRIBUTION MAP C'
FIG.19B
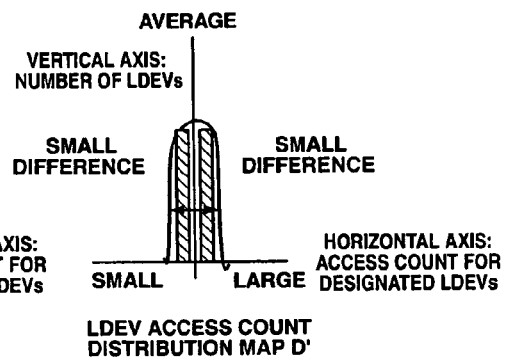
LDEV ACCESS COUNT
DISTRIBUTION MAP D'
FIG.20
| | Q50 |
|---|---|
| P# 03 | LARGE |
| P# 02 | |
| P# 01 | |
| P# 04 | SMALL |

PAGE ACCESS COUNT
DISTRIBUTION MAP E'

PAGE ACCESS COUNT
DISTRIBUTION MAP F'

STORAGE SYSTEM AND ACCESS COUNT EQUALIZATION METHOD THEREFOR

CROSS-REFERENCES TO RELATED APPLICATIONS

This application relates to and claims priority from Japanese Patent Application No. 2007-207232, filed on Aug. 8, 2007, the entire disclosure of which is incorporated herein by reference.

BACKGROUND

1. Field of the Invention

The invention relates generally to a storage system and access count equalization method for the storage system and is suitable for use in, for example, a storage system having a function of migrating data between parity groups, from a high-use parity group to a low-use parity group, and an access count equalization method for the storage system.

2. Description of Related Art

With the rapid increase in the amount of data in storage systems, users are required, at regular time intervals, to consider redesigning databases in the storage systems, including table definition and data size definition, as well as the review of the configurations of their storage systems, including system definition. The result of such a review of the system configuration may sometimes show unevenness in data access counts.

In order to solve the unevenness in the data access counts, a function called 'volume migration' that equalizes the data access counts to optimize a storage system (for example, see Patent Document 1) has been in existence. With the volume migration function, which uses virtual volumes, a system administrator for the storage system is capable of migrating data between parity groups, from a high-use parity group to a low-use parity group, either in units of volumes (logical devices) or in units of pages.

[Patent Document 1] JP2001-067187 A

However, although the above volume migration function is capable of migrating data from a high-use parity group to a low-use parity group either in units of volumes or in units of pages, it cannot judge which data migration—data migration in units of volumes or data migration in units of pages—is more suitable. Therefore, although system administrators can have their storage systems perform the volume migration function by selecting either of the data migration methods, they never be sure that if they are having the storage systems perform the optimal volume migration function.

This invention has been devised in light of the above points and aims to suggest a storage system capable of equalizing the access counts in the most appropriate units to optimize the entire storage system, and an access count equalization method for the storage system.

SUMMARY

This invention provides a storage system having: a host system; a plurality of disk drives for storing data transmitted from the host system via a network; and a memory apparatus having a plurality of groups to maintain the reliability of data in the disk drives and managing pool volumes in the groups using logical volumes and virtual volumes associated with the pool volumes, comprising: an access information table storing access information, which is information about the access counts for the pieces of data stored in the disk drives; a judgment unit for, when migrating data in the pool volumes to equalize the data access counts, judging which data migration—data migration in units of pages or data migration in units of volumes—is most appropriate based on the information in the access information table; a data migration unit for performing, based on the judgment made by the judgment unit, data migration in units of pages or data migration in units of volumes so that the data access counts are equalized among the groups; and a control unit for controlling the judgment unit and the data migration unit so that the judgment and data migration is repeated until the data access counts are equalized.

With the above configuration, when migrating data in the pool volumes to equalize the data access counts, which data migration—data migration in units of pages or data migration in units of volumes—is most appropriate is judged based on the information stored in the access information table storing access information, which is the information about the access counts for the data stored in the disk drives and, based on the judgment, data is migrated in units of pages or volumes so that the data access counts are equalized among the groups. The data migration is repeated until the data access counts are equalized among the groups.

Equalizing the access counts in pages units results in equalizing the access counts in units of logical volumes, which further results in equalizing the access counts among, for example, the parity groups. By equalizing the data access counts in appropriate units, usage efficiency of the disk drives can be improved and the entire storage system can be optimized.

According to this invention, a storage system capable of equalizing the access counts in the most appropriate units to optimize the entire storage system, and an access count equalization method for that storage system can be provided.

BRIEF DESCRIPTION OF THE DRAWINGS

FIG. 4 shows a load information table according to this invention.

FIG. 5 shows an access information table according to this invention.

FIG. 13 shows an example of the ranking order of the access counts according to this invention.

FIG. 14 shows another example of the ranking order of the access counts according to this invention.

FIG. 15 shows an example of an access count distribution map according to this invention.

FIG. 16 shows an example of the ranking order of the access counts according to this invention.

FIG. 17 shows an example of an access count distribution map according to this invention.

FIG. 18 shows an example of the ranking order for the access counts according to this invention.

FIG. 19 shows an example of an access count distribution map according to this invention.

FIG. 20 shows an example of the ranking order of the access counts according to this invention.

DETAILED DESCRIPTION OF PREFERRED EMBODIMENTS

Embodiments of this invention will be explained below with reference to the attached drawings.

Figure 1:
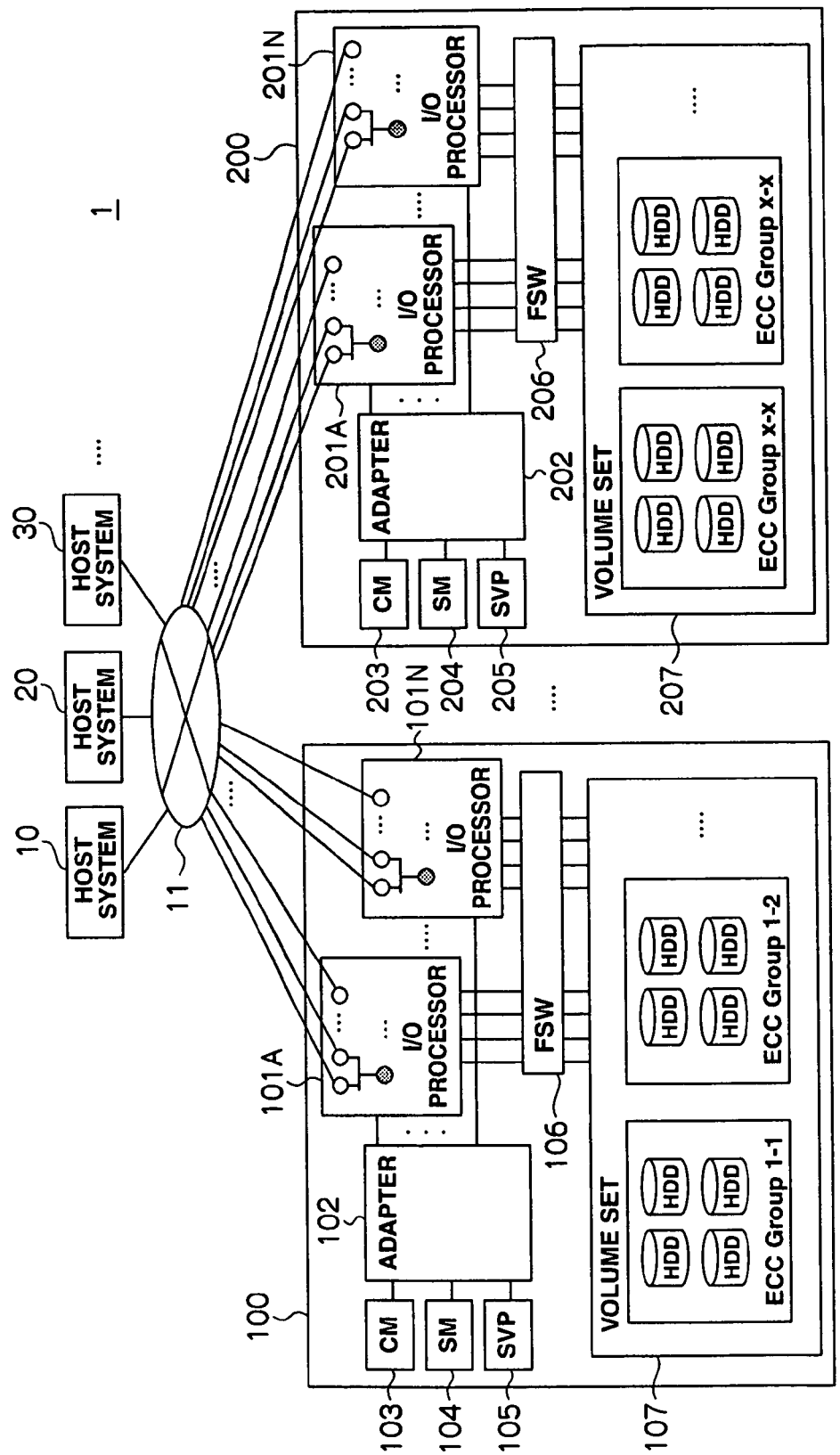
FIG. 1 shows the configuration of a storage system according to this invention.

FIG. 1 shows the configuration of a storage system 1 according to this invention. As shown in FIG. 1, the storage system 1 is configured so that host systems 10, 20, 30 . . . and memory apparatuses 100, 200, . . . are connected to one another via a network 11.

The host systems 10, 20, 30 . . . write/read data in/from the memory apparatuses 100, 200, . . . via the network 11. The host systems 10, 20, 30 . . . may either have a mainframe type OS or open type OS (for example, Windows (registered trademark), UNIX (registered trademark), etc.).

The memory apparatus 100 includes I/O processors 101A, . . . and 101N; adapter 102; cache memory (CM) 103; shared memory (SM) 104; SVP 105; fiber switch (FSW) 106; and volume set 107. The I/O processors 101A, . . . and 101N are connected the host systems 10, 20, 30, . . . via the network 11 to enable data communication therebetween and also connected to the adapter 102 and fiber switch 106. The adapter 102 is connected to, in addition to the I/O processors 101A, . . . and 101N, the cache memory 103, shared memory 104 and SVP 105. The fiber switch 106 is connected to the volume set 107.

The I/O processors 101A, . . . and 101N are input/output processors. They each have a micro processor and a plurality of ports. The ports are the points where cables for data communication with the host systems 10, 20, 30, . . . are connected. The micro processors in the I/O processors 101A, . . . and 101N each have various tables as well as the functions for performing equalization, which will be described later.

The adapter 102 connects the I/O processors 101A, . . . and 101N with the cache memory 103, shared memory 104, and SVP 105. The cache memory 103 momentarily stores data transmitted from the host systems 10, 20, 30, . . . via the network 11. The shared memory 104 stores various tables and other data. The SVP 105 is a console PC (personal computer) for controlling the memory apparatuses 100, 200, . . . . The fiber switch 106 connects the I/O processors 101A, . . . and 101N with the volume set 107.

The volume set 107 includes a plurality of ECC (Error Correcting Code) groups 1-1, 1-2, . . . , which are parity groups each consisting of four hard disk drives. Each ECC group 1-1, 1-2, . . . is a unit where data redundancy is provided by having four hard disk drives.

Explanations for the other memory apparatuses 200, . . . will be omitted because, although the reference codes are different, they have the same configurations as the memory apparatus 100.

Figure 2:
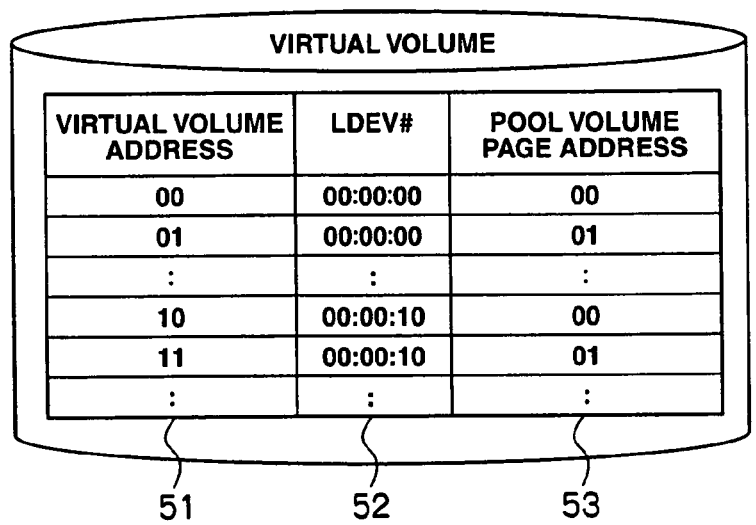
FIG. 2 shows a virtual volume management table according to this invention.
Figure 3:
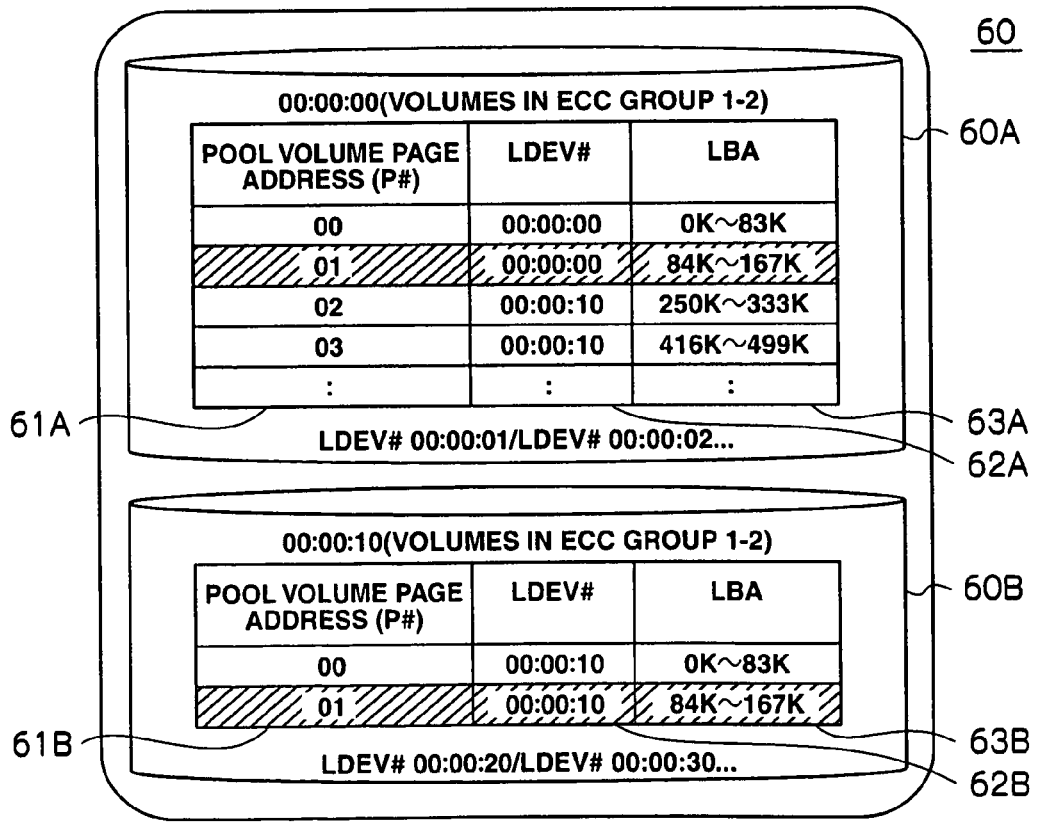
FIG. 3 shows a pool volume management table according to this invention.

FIGS. 2-5 show the tables the micro processors in the I/O processors 101A, . . . and 101N manage. FIG. 2 shows a virtual volume management table 50, FIG. 3 shows a pool volume management table 60, FIG. 4 shows a load information table 70, and FIG. 5 shows an access information table 80.

First, the virtual volume management table 50 shown in FIG. 2 will be explained below. The virtual volume management table 50 is used for the micro processors to manage the virtual volumes in the volume set 107. As shown in FIG. 2, the virtual volume management table 50 has a virtual volume address field 51, LDEV (logical device) number field (LDEV#) 52, and pool volume page address field 53.

The virtual volume address field 51 stores the addresses of the virtual volumes. The LDEV number field 52 stores the LDEV numbers. Note that the LDEVs are the data units used in the ECC groups 1-1, 1-2, . . . . The pool volume page address field 53 stores the page addresses of the pool volumes. Note that the pool volumes are real volumes associated with the virtual volumes and pages are the data units in the LDEVs.

In the virtual volume management table 50, pieces of data are stored while being associated with one another, for example, '00' is entered in the virtual volume address field 51, '00:00:00' is entered in the LDEV number field 52, and '00' is entered in the pool volume page address field 53.

The pool volume management table 60 shown in FIG. 3 will be explained below. The pool volume management table 60 is used for the micro processors in the I/O processors 101A, . . . and 101N to manage the pool volumes. The pool volume management table 60 consists of a plurality of tables 60A, 60B, . . . , corresponding to the ECC groups 1-1, 1-2, . . . in the volume set 107. As shown in FIG. 3, for example, the table 60A has a pool volume page address field 61A, LDEV number field 62A, and LBA (Logical Block Address) field 63A.

The pool volume page address field 61A stores the page addresses of the pool volumes. The LDEV number field 62A stores the LDEV numbers. The LBA field 63A stores LBAs.

In the table 60A in the pool volume management table 60, pieces of data are stored and associated with each other; for example, '00' is entered in the pool volume page address field 61A, '00:00:00' is entered in the LDEV number field 62A, and '0K-83K' is entered in the LBA field 63A.

The load information table 70 shown in FIG. 4 will be explained below. The load information table 70 is used for the micro processors in the I/O processors 101A, . . . and 101N to calculate loads. Note that the load information table 70 is created for each pool volume. As shown in FIG. 4, the load information table 70 consists of a time field 71 and day fields 72-78. In the time field 71, the same number of sections are provided as there are minutes in twenty-four hours. The day fields 72-78 correspond to Monday through Sunday.

As shown in FIG. 4, pieces of data are stored in the load information table 70. For example, '30' is entered in a box in the Monday field 72 corresponding to the '00:00-00:01' section in the time field 71, '20' is entered in a box in the Tuesday field 72 corresponding to the same section, . . . and '0' is entered in a box in the Sunday field 72 corresponding to the same section.

Figures 9, 10:
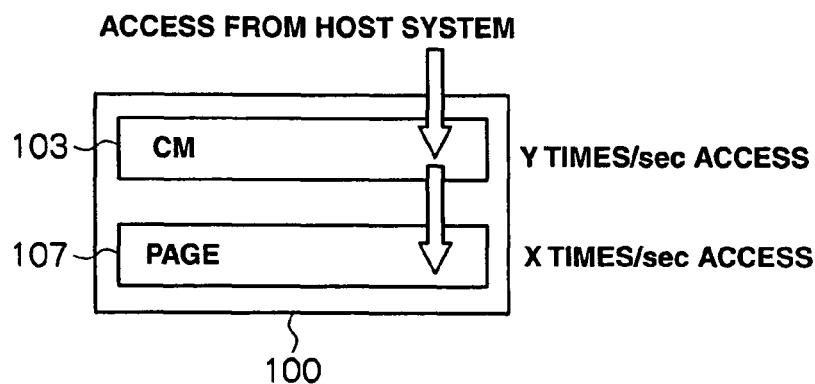
FIG. 9 explains a throughput calculation method according to this invention.
FIG. 10 shows a data migration determination table according to this invention.

A method for calculating the load values stored in the load information table 70 will be explained below. A load value is calculated as the mean throughput (per minute) for LDEVs. FIG. 9 illustrates the throughput calculation method. As shown in FIG. 9, the throughput for one page is calculated by (X−Y)*42/sec, where Y is the number of times the host systems 10, 20, 30, . . . access the cache memory 103 in one second, X is the number of times the pages in the volume set 107 are accessed in one second, and one access is 42 MB (82K LBA)/page. Thus, the micro processors in the I/O processors 101A, . . . and 101N calculate the loads to be stored in the load information table 70.

The access information table 80 shown in FIG. 5 will be explained below. The micro processors in the I/O processors 101A, . . . and 101N have access information tables 80 storing the access information for all the LDEVs, pages, and cache memory. The access information table 80 includes the average access count/min field 81, average access count/hour field 82, average access count/0K-83K field 83, average access count/84K-167K field 84, total access count field 85, cache memory's average access count/sec field 86, and access count field 87. In the access count field 87, the access counts calculated for each item in the above fields are stored.

For example, as shown in FIG. 5, in the access information table 80, '50' is entered in a box in the access count field 87 corresponding to the average access count/min field 81, '1000' is entered in a box in the access count field 87 corresponding to the average access count/hour field 82, '5' is entered in a box in the average access count/0K-83K field 83, '3' is entered in a box in the access count field 87 corresponding to the average access count/84K-167K field 84, '100000' is entered in a box in the access count field 87 corresponding to the total access count field 85, and '20' is entered in a box in the access count field 87 corresponding to the cache memory 103's average access count/sec field 86.

Figure 6:
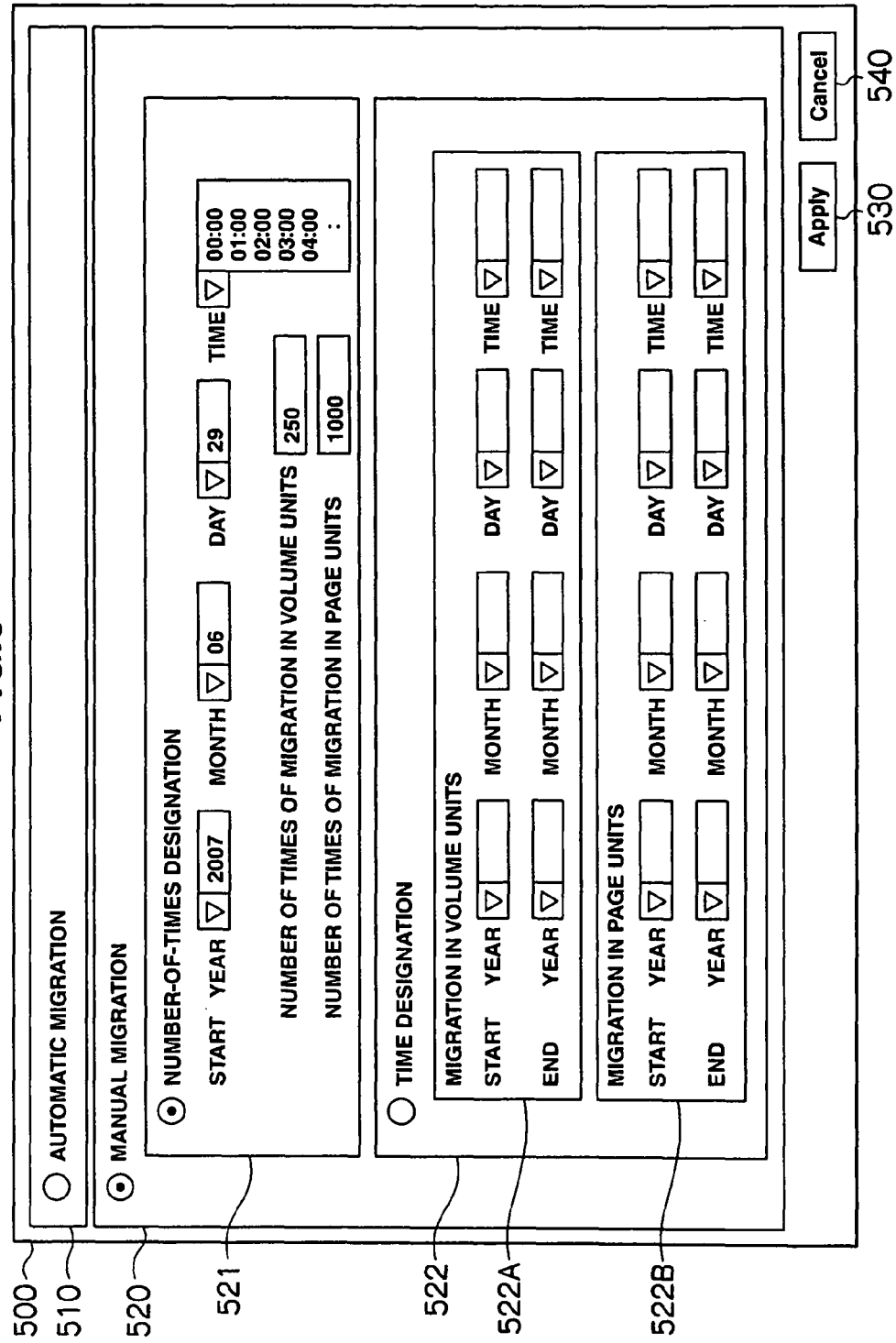
FIG. 6 shows an example of a display screen image according to this invention.

There are two patterns for having the memory apparatuses 100, 200, . . . perform the equalization processing (to be described later), i.e., equalization by automatic data migration or equalization by manual data migration. Setting of either the automatic data migration or manual data migration will be explained below. FIG. 6 shows an example of a display screen image for making settings for the equalization processing. Note that this display screen image 500 may be a display screen image on the SVP 105 in the memory apparatus 100, 200, . . . or a display screen image on an information processor (not shown in the drawing) connected to the network 11.

The display screen image 500 is configured so that one ticks either an automatic migration-setting field 510 or a manual migration-setting field 520 and the I/O processor 101 performs the equalization processing using the selected migration method. In FIG. 6, the manual migration-setting field 502 is ticked so that the manual migration will be performed.

The manual migration-setting field 520 includes a number-of-times designation field 521 and time designation field 522. The number-of-times designation field 521 is where a user designates the number of times to perform the equalization processing and the time designation field 522 is where the user designates the time to perform that processing.

In the number-of-times designation field 521, the year, month, date, and time to start the equalization processing can be selected with pull-down menus. The field 521 also includes a number-of-times of migration in-units-of-volumes field and a number-of-times of migration in-units-of-pages field. The user can input desired numbers in these fields.

In the time designation field 522, the user can set the time to perform the equalization processing. The time designation field 522 includes a migration in-units-of-volumes field 522A and migration in-units-of-pages field 522B. In these fields, the user can select the years, months, dates, and times to start and end the migration with the pull-down menus.

At the bottom right of the display screen image 500, an apply button 530 and cancel button 540 are displayed. The user chooses the apply button 530 to confirm the settings made in the automatic migration-setting field 510 or manual migration-setting field 520. The user chooses the cancel button 540 to cancel the settings made in the same. When the user makes desired settings in the automatic migration-setting field 510 or manual migration-setting field 520 and chooses the apply button 530, those settings will be reflected in the storage system 1.

Figure 7:
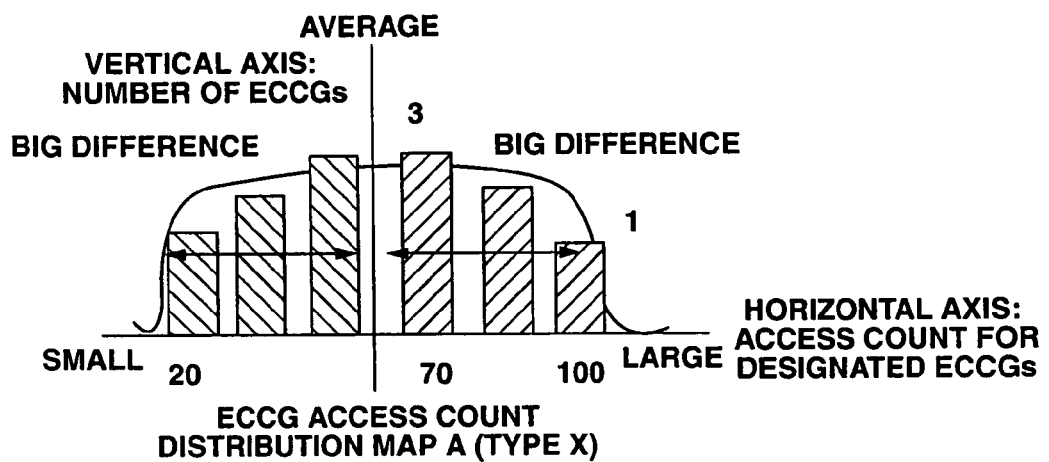
FIG. 7 shows an example of an access count distribution map according to this invention.

The types of the access count distribution maps will be explained below. There are two types—type X and type Y—of distribution maps. FIG. 7 shows an example of an X-type ECC group access count distribution map. The vertical axis of the distribution map indicates the number of ECC groups and the horizontal axis indicates the access count for designated ECC groups. As shown in FIG. 7, an X-type distribution map shows that there is a big difference between the smallest access count and the largest access count.

Figure 8:
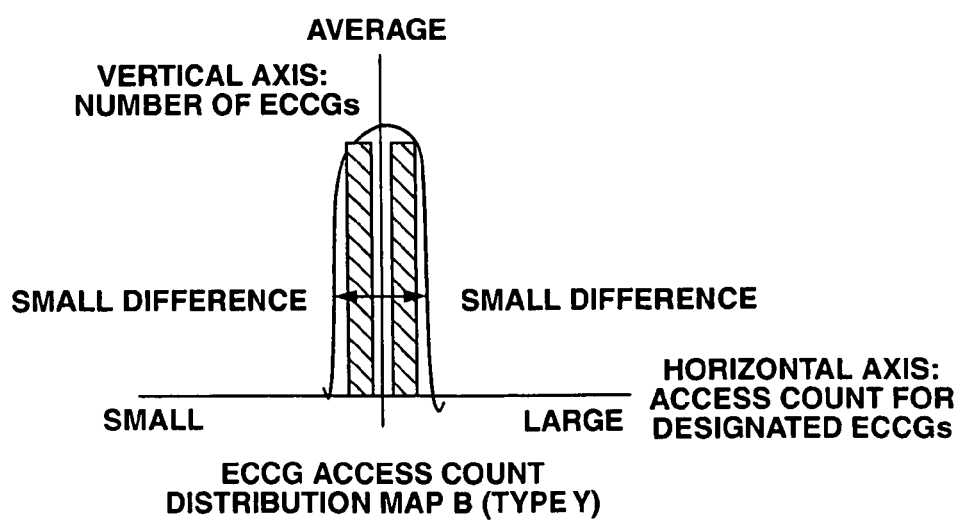
FIG. 8 shows another example of an access count distribution map according to this invention.

Meanwhile, FIG. 8 shows an example of a Y-type ECC group access count distribution map. Just like in the case of type X, the vertical axis of the Y-type distribution map indicates the number of ECC groups and the horizontal axis indicates the access count for designated ECC groups. As shown in FIG. 8, an Y-type distribution map shows that there is a small difference between the access counts.

Note that, regarding the horizontal axes in both types of maps, either the access count/hour, access count/day, access count/week, access count/month, or access count/year may be selected. A time interval may also be selected from among: every other hour, every other day, every other week, every other month, or every other year.

When an ECC group access count distribution map is type X, it is necessary to equalize the access counts by performing volume migration or page migration so that the map will be type Y. Meanwhile, when an ECC group access count distribution map is type Y, the access counts have been already equalized so there is no need to perform the equalization.

Explanations will be given below for a date migration determination table 90 the I/O processor 101A refers to when determining whether or not to perform data migration by comparing two page access count distribution maps. FIG. 10 shows the data migration determination table 90. This table is used when the I/O processor 101A determines whether or not to perform data migration to equalize access counts based on the relationships between the types of distribution maps and throughputs. Note that each I/O processor 101A, . . . and 101N is capable of performing the equalization processing; however, for ease of explanation, the below explanation is based on the assumption that the I/O processor 101A performs the processing.

In the date migration determination table 90, a distribution map type field is divided into three sections corresponding to three cases—the case where the two distribution maps are both type X, the case where they are both type Y, and the case where both types are different. These sections are associated with the sections in the throughput field corresponding to three cases—the case where the throughput is high, the case where the throughput is medium, and the case where the throughput is low. Note that values for high, medium, low throughputs may be determined by, for example, obtaining large and small throughput values from the load information table 70, calculating a mean value based on the above-obtained large and small values to be set as a medium value, and setting these large, medium, and small values as the high, medium, and low throughputs. However, there is no limitation to this setting method.

According to the data migration determination table 90 shown in FIG. 10, whether or not to perform the data migration is determined as follows. When the two page access count distribution maps are both type X, data is migrated in units of pages regardless of the value—large, medium, small—or the throughput. When the two maps are both type Y and if the value of the throughput is large or medium, data is not migrated, however, if the throughput value is small, data migration in volume units is performed. When the two maps are of different types, data is not migrated.

Figure 11:
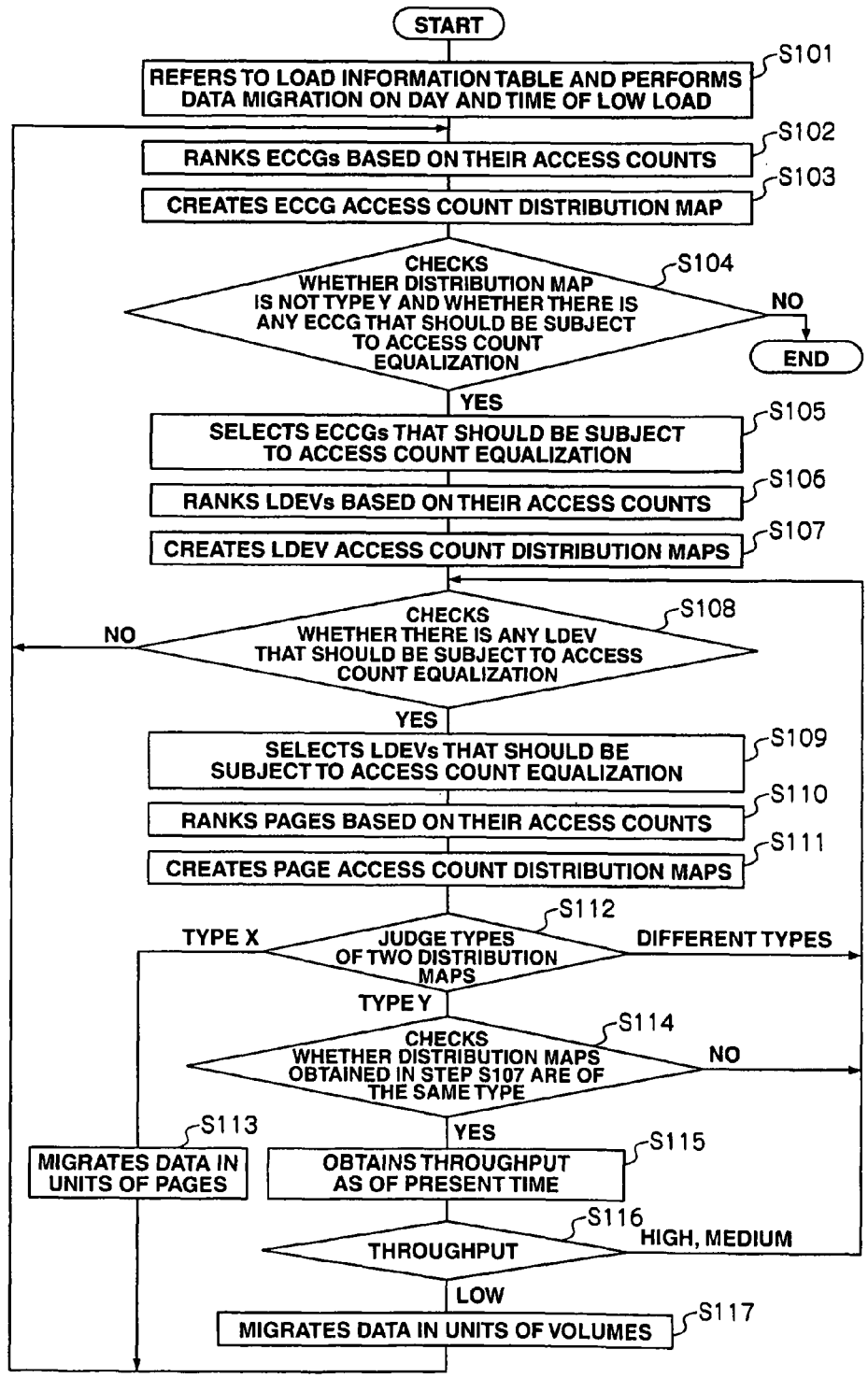
FIG. 11 is a flowchart showing automatic equalization processing according to this invention.

The procedure for the automatic data migration performed by the I/O processor 101A to achieve the equalization will be explained below. FIG. 11 shows a flowchart for the automatic data migration.

Steps S101-106 are the processing of an ECC group level. In step S101, the I/O processor 101A refers to the load information table 70 and performs data migration on a day and a time when the load is low. In step S102, it refers to the access information table 80 and ranks the ECC groups 1-1, 1-2, . . . based on their access counts.

The ranking order of the ECC groups 1-1, 1-2, . . . based on their access counts will be, for example, as shown in Q10 in FIG. 13. The access counts can be obtained by summing the access counts for the LDEVs, with reference to the access information table 80. In the list of FIG. 13, the ECC groups are ranked in descending order of their access counts, from top to bottom.

In step S103, the I/O processor 101A creates an ECC group access count distribution map. Consequently, as explained with reference to FIGS. 7 and 8, a distribution map of type Y or type X is obtained.

In step S104, the I/O processor 101A checks the type of the distribution map and also checks whether there is any ECC group that should be subject to the access count equalization. If the distribution map is not type Y and there is (non-processed) ECC group(s) that should be subject to the access count equalization, it proceeds the processing. If the distribution map is type Y or there is no ECC group that should be subject to the access count equalization, the I/O processor 101A terminates the processing. This is because a Y-type map shows that the access counts have been equalized and there is no need to perform the equalization.

In step S105, the I/O processor 101A selects ECC groups having a large access count and a small access count. In the example shown in FIG. 13, the ECC group with a large access count is ECCG1-1 (access count is 100) and the ECC group with a small access count is ECCG1-4 (access count is 20), so these two ECC groups are selected.

In step S106, the I/O processor 101A refers to the access information table 80 and ranks the LDEVs in the ECC groups 1-1 and 1-4 based on their access counts. FIG. 14 shows an example Q20 of the ranking order of the LDEVs in the ECC group 1-1 based on their access counts. In this list, the LDEVs are arranged in the descending order of their access counts, from the top to the bottom. FIG. 18 shows an example Q40 of the ranking order of the LDEVs in the ECC group 1-4 based on their access counts. Also in this list, the LDEVs are arranged in descending order of their access counts, from top to bottom.

Steps S107-109 are the processing on an LDEV level. In step S107, the I/O processor 101A creates LDEV access count distribution maps. In the above example, it creates a distribution map of the LDEV access counts for each of the ECC group 1-1 and the ECC group 1-4. FIG. 15 shows examples of a distribution map of the access counts for the LDEVs in the ECC group 1-1. The LDEV access count distribution map C in FIG. 15A indicates that there is a big difference between the access counts and the LDEV access count distribution map D in FIG. 15B indicates that the difference between the access counts is small. Note that an LDEV access count distribution map either of FIG. 15A or FIG. 15B is obtained for the ECC group 1-1. FIG. 19 shows examples of a distribution map of the access counts for the LDEVs in the ECC group 1-4. The LDEV access count distribution map C' in FIG. 19A indicates that there is a big difference between the access counts and the LDEV access count distribution map D' in FIG. 19B indicates that the difference between the access counts is small. Note that an LDEV access count distribution map either of FIG. 19A or FIG. 19B is obtained for ECC group 1-4.

In step S108, the I/O processor 101A checks whether there is an LDEV that should be subject to the access count equalization. If there is an LDEV that should be subject to the access count equalization (i.e., a non-processed LDEV) (S108: Yes), it proceeds the processing. If there is no such LDEV (S108: No), it returns to step S102.

In step S109, the I/O processor 101A selects an LDEV having the largest access count in the ECC group 1-1 having the large access count, and selects an LDEV having the smallest access count in the ECC group 1-4 having the small access count.

Step S110 is the processing on a page level. More specifically, in step S110, the I/O processor 101A refers to the access information table 80 and ranks the pages in the LDEVs selected in step S109 based on their access counts. FIG. 16 shows an example Q30 of the access ranking order of the pages in the LDEV selected in the ECC group 1-1 having the large access count, and FIG. 20 shows an example Q50 of the access ranking order of the pages in the LDEV selected in the ECC group 1-4 having the small access count. In both lists in FIGS. 16 and 20, the pages are arranged in descending order of their access counts, from top to bottom.

Figure 21A:
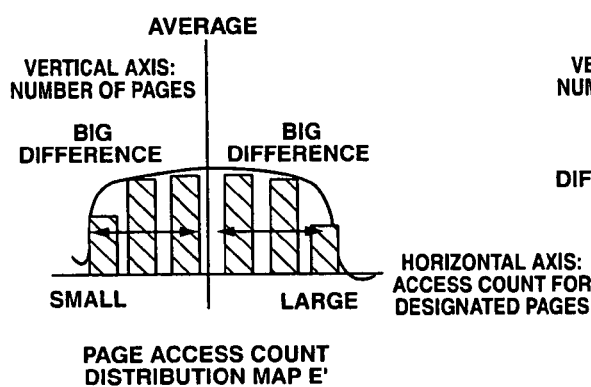
FIG. 21 shows an example of an access count distribution map according to this invention.
Figure 21B:
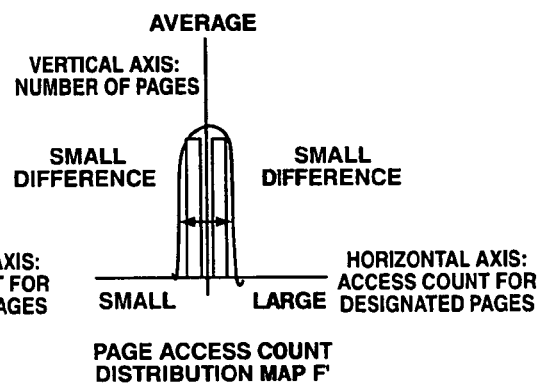

In step S111, the I/O processor 101A creates page access count distribution maps based on the ranking order created in step S110. FIG. 17 shows examples of the page access count distribution maps created based on the access ranking order of the pages in the LDEV selected in the ECC group 1-1 having the large access count. The page access count distribution map E in FIG. 17A indicates that the difference between the access counts is large while the page access count distribution map F in FIG. 17B indicates that the difference between the access counts is small. Note that a page access count distribution map of either FIG. 17A or FIG. 17B is obtained for the above LDEV. FIG. 21 shows examples of the page access count distribution maps created based on the access ranking order of the pages in the LDEV selected in the ECC group 1-4 having the small access count. The page access count distribution map E' in FIG. 21A indicates that the difference between the access counts is large while the page access count distribution map F' in FIG. 21B indicates that the difference between the access counts is small. Note that a page access count distribution map either of FIG. 21A or FIG. 21B is obtained for the LDEV.

In step S112, the I/O processor 101A checks whether the two distribution maps created in step S111 are both type X, type Y, or of different types.

If the two distribution maps are both type X, in step S113, the I/O processor 101A migrates the relevant data in units of pages. This is because an X-type map shows that the access counts widely range from a large number to a small number and so it is suitable to migrate data in small units, such as page units, only where migration is required. Moreover, because the migration is performed in small units, i.e., pages, the loads on the data can be kept small regardless of whether the current throughput is high, medium, or low, so there is no problem in performing the page migration. After the data migration, the I/O processor 101A returns to step S102 and repeats the steps of the processing on the ECC group level.

Figure 22:
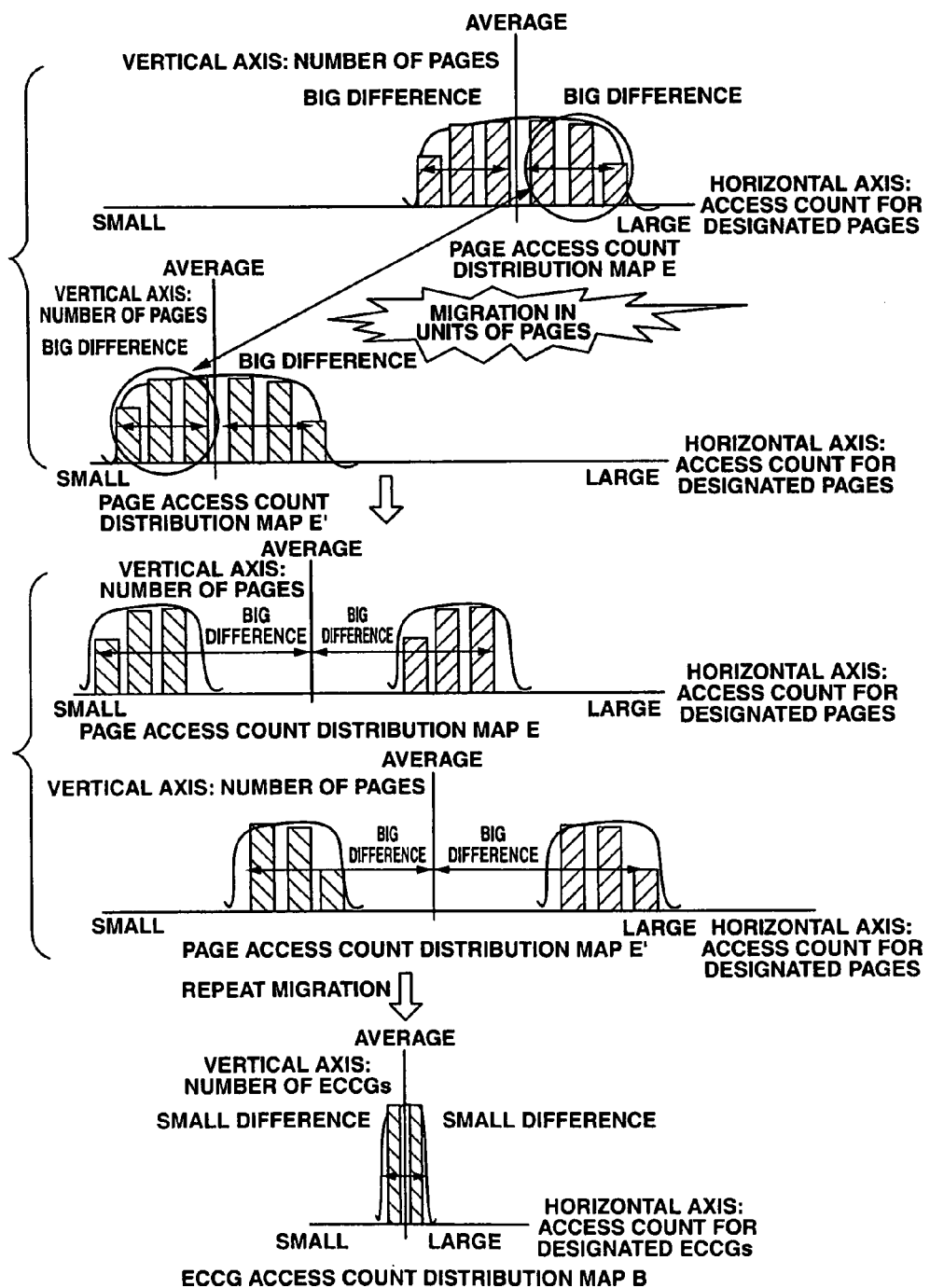
FIG. 22 shows data migration in units of pages according to this invention.

FIG. 22 illustrates the data migration in units of pages. By migrating relevant data in units of pages based on the above-created page access count distribution maps E and E', the difference between the page access counts can be reduced as shown in the upper and middle rows in FIG. 22. By repeating the data migration, the access counts can be equalized as shown in the bottom row in FIG. 22.

Meanwhile, if the two distribution maps created in step S111 are of different types, the I/O processor 101A does not migrate the data but returns to step S108 to repeat the steps of the processing on the LDEV level. This is because, if the two distribution maps are of different types, units for data migration cannot be specified. Moreover, if the data were migrated, there is a risk that the current equalized state may be lost, so data migration is not performed.

Meanwhile, if the two distribution maps created in step S111 are both type Y, in step S114, the I/O processor 101A checks whether the LDEV access count distribution maps obtained in step S107 are of the same type.

Figure 23:
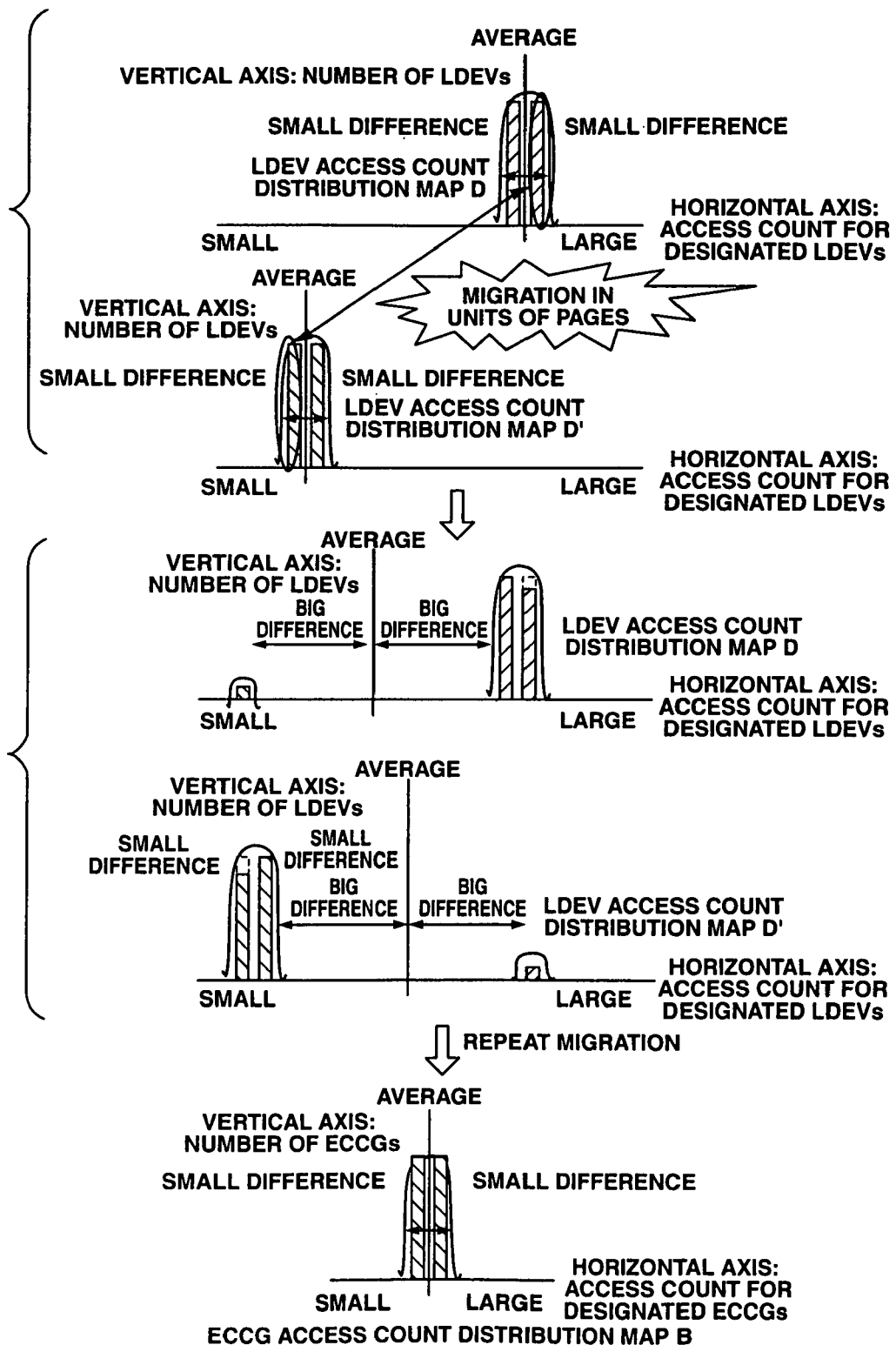
FIG. 23 shows data migration in units of volumes according to this invention.

FIG. 23 illustrates data migration in units of LDEVs. By migrating relevant data in units of volumes based on the above LDEV access count distribution maps D and D', the difference between the LDEV access counts can be reduced as shown in the upper and middle rows in FIG. 23. By repeating the data migration, the access counts can be equalized as shown in the bottom row in FIG. 23.

If the LDEV access count distribution maps obtained in step S107 are of the same type, the I/O processor 101A obtains the throughput as of the present time in step S115 and checks the throughput in step S116.

If the current throughput is low, in step S117, the I/O processor 101A migrates relevant data in units of volumes. This is because a Y-type map shows that the access counts do not vary over a wide range and it is suitable to migrate data in large units such as volume units. Moreover, because the current throughput is low, the load caused by the data migration can be kept small, so there is no problem in performing the volume migration. After the migration, the I/O processor 101A returns to step S102 and repeats the steps for the processing on the ECC group level.

Meanwhile, if the LDEV access count distribution maps obtained in step S107 are of the same type and the throughput is high or medium, I/O processor 101A does not perform data migration but returns to step S108 to repeat the steps for the processing on the LDEV level. This is because although the page access count distribution maps created in step S111 are both type Y, which means that the access counts do not vary over a wide range and it is suitable to migrate data in large units such as volumes units, because the current throughput is not low, the data migration in large units, i.e., volumes units, will increase the load and may impair the equalized state, so data migration will not be performed.

Accordingly, with the above-explained automatic access count equalization processing in the storage system 1, when migrating data within parity groups, i.e., ECC groups, for example, from a high-use group to a low-use group, it is possible to specify which data migration—either the data migration in page units or data migration in volume units—is most appropriate. Accordingly, optimal access count equalization can be performed in the storage system 1, optimizing the entire storage system 1.

The outline of the manual data migration, which is manually instructed by the user to achieve the equalization will be explained below. The manual data migration differs from the automatic data migration in that: the user designates parameters for the data migration method (S201); data is migrated on a date and a time designated the user (S202); and, after whether the parameters the user designates for the data migration method indicate the migration in units of pages or migration in units of volumes is checked (S210), whether or not the equalization processing has been repeated as many times as specified by the user's parameters is checked (S213). The other steps are the same as those in the automatic data migration, so detailed explanations will be omitted.

Figure 12:
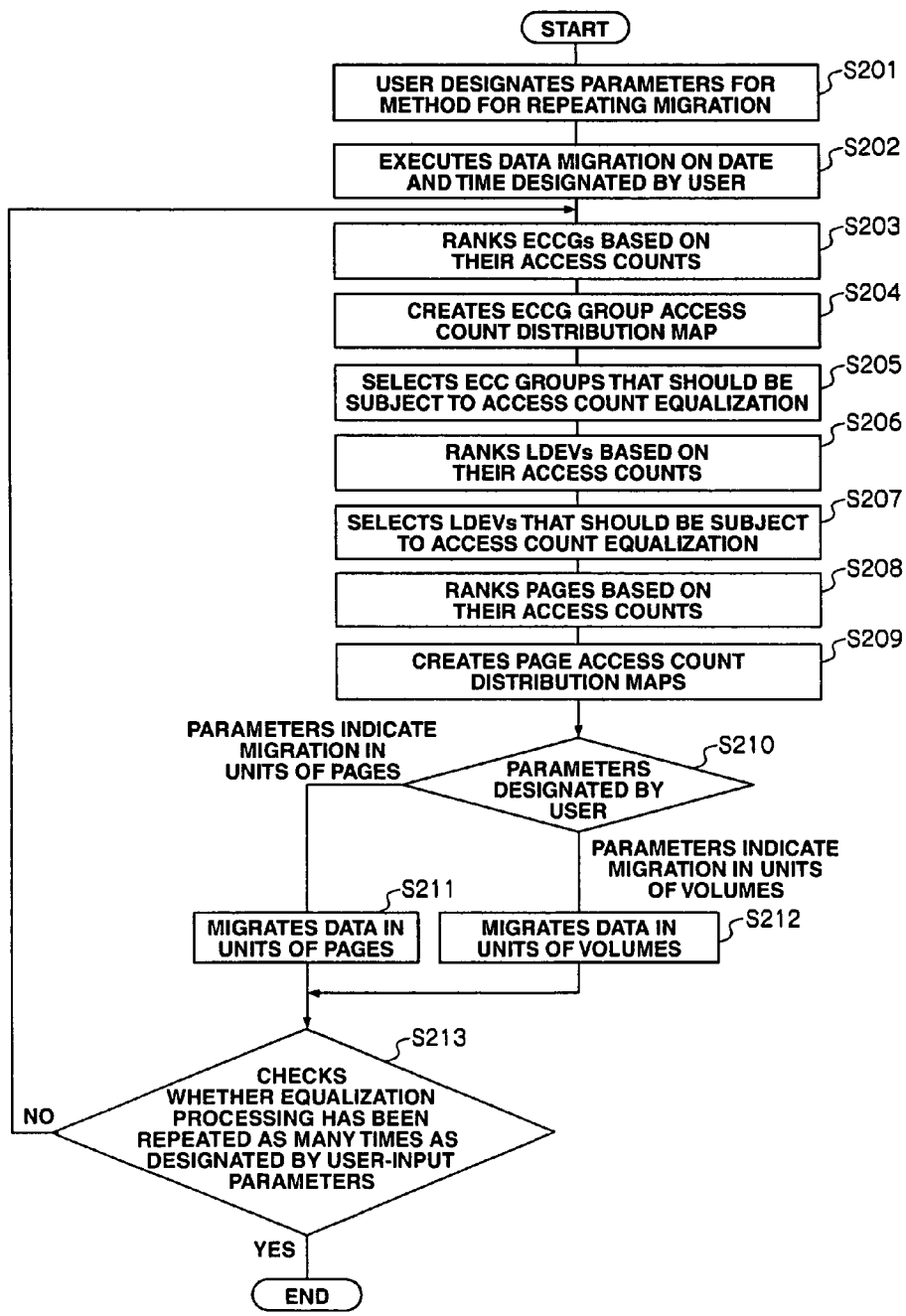
FIG. 12 is a flowchart showing manual equalization processing according to this invention.

The procedure of the manual data migration manually instructed by the user to achieve the equalization will be explained below. FIG. 12 is a flowchart illustrating the processing the I/O processor 101A executes for the manual data migration.

First, in step S201, the user designates the number of times to execute the volume migration and page migration, or the period—dates and times—during which the access count equalization processing is repeated. The user designates these parameters on the display screen image 500 shown in FIG. 6. The I/O processor 101A then obtains the data designated on the display screen image 500. In step S202, the I/O processor 101A executes data migration on the date and time designated by the user.

In step S203, the I/O processor 101A ranks the ECC groups 1-1, 1-2, . . . based on their access counts. In step S204, it creates a distribution map of the access counts for the ECC groups 1-1, 1-2, . . . . In step S205, it selects an ECC group having a large access count and an ECC group having a small access count.

Then, in step S206, the I/O processor 101A ranks the LDEVs in the selected ECC groups, based on their access counts. In step S207, it selects LDEVs that should be subject to the access count equalization. In step S208, it ranks the pages in the selected LDEV(s) based on their access counts. In step S209, it creates page access count distribution maps.

In step S210, the I/O processor 101A checks whether the parameters the user designates for the data migration method indicate the migration in units of pages or the migration in units of volumes. If the parameters indicate the migration in units of pages, in step S211, the I/O processor 101A migrates relevant data in units of pages. Meanwhile, if the parameters indicate the migration in units of volumes, in step S212, the I/O processor 101A migrates the data in units of volumes.

In step S213, the I/O processor 101A checks whether the equalization processing has been repeated as many times as designated by the user-input parameters, and if not, it returns to step S203, but if so, it terminates the processing.

Accordingly, in the equalization by means of the manual data migration, just as in the case of the automatic data migration, an I/O processor automatically judges which data migration—data migration in page units or data migration in volume units—is most appropriate before migrating data. Therefore, in the storage system 1, the access count equalization can be performed optimally, thereby optimizing the entire storage system 1.

In the above embodiment, this invention is applied to the storage system 1 that has: the host systems 10, 20, 30, . . . ; a plurality of disk drives (HDDs) for storing data transmitted from the host systems 10, 20, 30, . . . via the network 11; and a memory apparatus including a plurality of parity groups (ECC groups) to maintain the reliability of the data in the disk drives (HDDs) and managing pool volumes in the parity groups using logical volumes and virtual volumes associated with those pool volumes. In the storage system 1, the access information—the information about the access counts for the data stored in the disk drives (HDDs)—is stored in the access information table 80; the I/O processor 101A judges, when migrating data in the pool volumes to equalize the data access counts, which data migration—data migration in page units or data migration in volume units—is most appropriate based on the information in the access information table 80; based on that judgment, the I/O processor 101A migrates data in units of pages (S113) or in units of volumes (S117) so that the data access counts are equalized among the parity groups; and it repeats the data migration until the data access counts are equalized. This invention, however, is not limited to that embodiment.

Also, in the above embodiment, the load information table 70 stores the throughput values that indicate the loads caused by the access to the data in the pool volumes and the I/O processor 101A refers to this table and performs the equalization processing on a day and a time when the load is smallest. However, the loads are not limited to the throughput values and the equalization processing may be performed not only on the days and times of light loads shown in the load information table 70.

Further, in the above embodiment, the I/O processor 101A creates an ECC group access count distribution map with reference to the access information table 80 (S103) and judges whether there is any ECC group that should be subject to the equalization according to the type of that map (S104). However, the distribution map creation method is not limited to that embodiment.

Furthermore, in the above embodiment, when the I/O processor 101A judges that there is an ECC group(s) that should be subject to the equalization, it creates an LDEV access count distribution map for each of the ECC group having the largest access count and the ECC group having the smallest access count with reference to the access information table 80 (S107), and judges whether there is any LDEV that should be subject to the equalization according to the types of the two created maps (S108). However, the distribution map creation method is not limited to the method in that embodiment.

Moreover, in the above embodiment, when the I/O processor 101A judges that there are LDEVs that should be subject to the equalization, it creates a page access count distribution map for each of the LDEV having the largest access count and the LDEV having the smallest access count, with reference to the access information table 80 (S111). However, the distribution map creation method is not limited to the method in that embodiment.

Further, in the above embodiment, there are two types of distribution maps created when the I/O processor 101A judges that there are LDEVs that should be subject to the equalization, i.e., type X indicating that the difference between the page access counts is large, and type Y indicating the difference is small, and when the two distribution maps are both type X (S112: type X), data is migrated in units of pages (S113).

Furthermore, in the above embodiment, there are two types of distribution maps created when the I/O processor 101A judges that there are LDEVs that should be subject to the equalization, i.e., type X indicating that the difference between the page access counts is large and type Y indicating that the difference is small; and there are two types of distribution maps created when the I/O processor 101A judges that there are ECC groups that should be subject to the equalization, i.e., type X indicating that the difference between the LDEV access counts is large and type Y indicating that the difference is small; and when the distribution maps created when the I/O processor 101A judges that there are LDEVs to be subject to the equalization are both of the latter type (S112: type Y) and when the distribution maps created when the I/O processor 101A judges that there are ECC groups to be subject to the equalization are of the same type (S114: Yes), it calculates the load as of the present time (S115), and if that load is small (S116: Small), it migrates data in units of volumes (S117). However, this invention is not limited to that embodiment.

Also, in the above embodiment, the display unit for setting either having the I/O processor 101A perform the processing on a predetermined timing or having the I/O processor 101A on a timing designated by the user, is the display screen image 500. However, the display unit is not limited to the display screen image 500.

This invention can be widely applied in storage systems and access count equalization methods for the storage systems.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage system having: a host system; a plurality of disk drives for storing data transmitted from the host system via a network; and a memory apparatus having a plurality of groups to maintain the reliability of data in the disk drives and managing pool volumes in the groups using logical volumes and virtual volumes associated with the pool volumes, comprising:

an access information table storing access information, which is information about the access counts for the pieces of data stored in the disk drives;

a judgment unit for, when migrating data in the pool volumes to equalize the data access counts, judging which data migration—data migration in units of pages or data migration in units of volumes—is most appropriate based on the information in the access information table;

a data migration unit for performing, based on the judgment made by the judgment unit, data migration in units of pages or data migration in units of volumes so that the data access counts are equalized among the groups; and a control unit for controlling the judgment unit and the data migration unit so that the judgment and data migration is repeated until the data access counts are equalized;

the judgment unit includes:

a first distribution map creation portion for creating a group access count distribution map with reference to the access information table;

a first judgment portion for judging whether there is any group that should be subject to the equalization according to the type of the group access count distribution map created by the first distribution map creation unit;

a second distribution map creation portion for, when the first judgment portion judges that there is a group(s) that should be subject to the equalization, creating a logical volume access count distribution map for each of the group having the largest access count and the group having the smallest access count, with reference to the access information table;

a second judgment portion for judging whether there is any logical volume that should be subject to the equalization according to the types of the logical volume access count distribution maps created by the second distribution map creation unit; and a third distribution map creation portion for, when the second judgment portion judges that there is a logical volume(s) that should be subject to the equalization, creating a page access count distribution map for each of the logical volume having the largest access count and the logical volume having the smallest access count, with reference to the access information table;

wherein there are two types of distribution maps the third distribution map creation portion creates, which are a first type indicating that the difference between the page access counts is large and a second type indicating that the difference is small; and when the two distribution maps the third distribution map creation portion creates are both of the first type, the data migration unit migrates data in units of pages.

2. The storage system according to claim 1, further comprising a load information table storing load information, which is the information about the load caused by the access to the data in the pool volumes, and wherein, judgment by the judgment unit and data migration by the data migration unit are performed at a time of light load, which is specified according to the load information table.

3. The storage system according to claim 1, wherein there are two types of distribution maps the third distribution map creation portion creates, i.e., a first type indicating that the difference between the page access counts is large and a second type indicating that the difference is small;

there are two types of distribution maps the second distribution map creation portion creates, i.e., a third type indicating that the difference between the logical volume access counts is large and a fourth type indicating that the difference is small; and when the two distribution maps the third distribution map creation portion creates are both of the second type and the distribution maps the second distribution map creation portion creates are both of the same type, the load as of the present time is calculated and, if that load is small, the data migration unit migrates the data in units of volumes.

4. The storage system according to claim 1, further comprising a display unit used for selecting either having the control unit perform the processing at a predetermined time or having the control unit perform the processing at a time designated by a user.

5. An access count equalization method for a storage system, wherein the storage system comprises: a host system; a plurality of disk drives for storing data transmitted from the host system via a network; and a memory apparatus having a plurality of groups to maintain the reliability of data in the disk drives and managing pool volumes in the groups using logical volumes and virtual volumes associated with the pool volumes, the method comprising the steps of:

judging, when migrating data in the pool volumes to equalize the data access counts, which data migration—data migration in units of pages or data migration in units of volumes—is most appropriate based on the information stored in an access information table storing access information, which is information about the access counts for the data stored in the disk drives;

performing, based on the judgment made in the judgment step, data migration in units of pages or data migration in units of volumes so that the data access counts are equalized among the groups; and repeating the judgment step and the data migration step until the data access counts are equalized;

the step of judging which data migration is most appropriate includes the steps of:

creating a group access count distribution map with reference to the access information table; and judging whether there is any group that should be subject to the equalization according to the type of the group access count distribution map created;

when it is judged that there is a group(s) that should be subject to the equalization, creating a logical volume access count distribution map for each of the group having the largest access count and the group having the smallest access count, with reference to the access information table; and judging whether there is any logical volume that should be subject to the equalization according to the types of the logical volume access count distribution maps created;

when it is judged that there is logical volume(s) that should be subject to the equalization, creating page an access count distribution map for each of the logical volume having the largest access count and the logical volume having the smallest access count, with reference to the access information table;

wherein there are two types of distribution maps created when it is judged that there is a logical volume(s) that should be subject to the equalization, which are a first type indicating that the difference between the page access counts is large and a second type indicating that the difference is small; and when the two distribution maps are both of the first type, data is migrated in units of pages in the data migration step.

6. The access count equalization method for a storage system according to claim 5, wherein the judgment step and data migration step are performed at a time of light load, which is specified according to the load information table when the load stored in the load information table is small.

7. The access count equalization method for a storage system according to claim 5, wherein there are two types of distribution maps created when it is judged that there is a group(s) that should be subject to the equalization, which are a third type indicating that difference between the logical volume access counts is large and a fourth type indicating that the difference is small; and when the two distribution maps created when it is judged that there is a logical volume(s) that should be subject to the equalization are both of the second type and the distribution maps created when it is judged that there is a group(s) that should be subject to the equalization are both of the same type, the load as of the present time is calculated and, if that load is small, data is migrated in units of volumes in the data migration step.

* * * * *